(12) United States Patent
Oi et al.

(10) Patent No.: US 9,071,379 B2
(45) Date of Patent: Jun. 30, 2015

(54) OPTICAL BRANCHING AND INSERTION DEVICE, NETWORK MANAGEMENT DEVICE, AND WAVELENGTH SELECTIVE SWITCH

(71) Applicant: FUJITSU LIMITED, Kawasaki-shi, Kanagawa (JP)

(72) Inventors: Hiroki Oi, Kawasaki (JP); Takafumi Terahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 13/909,245

(22) Filed: Jun. 4, 2013

(65) Prior Publication Data

US 2014/0010535 A1    Jan. 9, 2014

(30) Foreign Application Priority Data

Jul. 4, 2012  (JP) .................................. 2012-150784

(51) Int. Cl.
  *H04J 14/02*  (2006.01)
(52) U.S. Cl.
  CPC ......... *H04J 14/0212* (2013.01); *H04J 14/0204* (2013.01); *H04J 14/0217* (2013.01); *H04J 14/0257* (2013.01); *H04J 14/0271* (2013.01)
(58) Field of Classification Search
  CPC ...................................... H04J 14/021–14/0213
  USPC ........................................................ 398/83, 95
  See application file for complete search history.

(56) References Cited

U.S. PATENT DOCUMENTS

| | | | |
|---|---|---|---|
| 2006/0133723 A1* | 6/2006 | Tian et al. ........................ | 385/18 |
| 2010/0129076 A1* | 5/2010 | Barbarossa ...................... | 398/48 |
| 2012/0020664 A1* | 1/2012 | Sakurai et al. .................. | 398/50 |
| 2014/0072301 A1* | 3/2014 | Barnard et al. ................. | 398/48 |

FOREIGN PATENT DOCUMENTS

JP      2010-98544      4/2010

* cited by examiner

*Primary Examiner* — Nathan Curs
(74) *Attorney, Agent, or Firm* — Staas & Halsey LLP

(57) ABSTRACT

An optical branching and insertion device includes an optical splitter that branches an input optical signal, and outputs the branched optical signal from a first output port and a second output port; a wavelength selective switch that allows passage of an optical signal of a predetermined wavelength from among optical signals input to a first input port from the first output port, and outputs the optical signal of the predetermined wavelength and an optical signal inputted from a second input port; and a processor that executes a process to expand a band through which the optical signal of the predetermined wavelength is allowed to pass, the process being executed when a channel allocated to a wavelength of the optical signal inputted from the second input port and a channel allocated to the predetermined wavelength are not adjacent.

12 Claims, 17 Drawing Sheets

FIG. 9

| CHANNEL | WAVELENGTH | INPUT SOURCE PATH | OUTPUT DESTINATION PATH | SETTINGS |
|---|---|---|---|---|
| CH1 | $\lambda 1$ | #1 | - | BRANCH |
| CH2 | $\lambda 2$ | - | #2 | INSERT |
| CH3 | $\lambda 3$ | - | - | NOT USED |
| CH4 | $\lambda 4$ | #1 | #2 | PASS |
| CH5 | $\lambda 5$ | - | - | NOT USED |
| CH6 | $\lambda 6$ | #1 | #2 | PASS |
| CH7 | $\lambda 7$ | #1 | #2 | PASS |
| CH8 | $\lambda 8$ | #1 | - | BRANCH |
| CH9 | $\lambda 9$ | #1 | #2 | PASS |
| CH10 | $\lambda 10$ | - | #2 | INSERT |
| ... | ... | ... | ... | ... |

FIG. 10

| CHi \ CHi±1 | PASS SETTING | INSERT SETTING | BRANCH SETTING | NOT-USED SETTING |
|---|---|---|---|---|
| PASS SETTING | NG | NG | NG | OK |
| INSERT SETTING | NG | NG | NG | NG |
| BRANCH SETTING | NG | NG | NG | NG |
| NOT-USED SETTING | OK | NG | NG | NG | though

OPTICAL BRANCHING AND INSERTION DEVICE, NETWORK MANAGEMENT DEVICE, AND WAVELENGTH SELECTIVE SWITCH

CROSS-REFERENCE TO RELATED APPLICATION

This application is based upon and claims the benefit of priority from the prior Japanese Patent Application No. 2012-150784 filed on Jul. 4, 2012, the entire contents of which are incorporated herein by reference.

FIELD

The embodiments discussed herein are related to an optical branching and insertion device, a network management device, and a wavelength selective switch.

BACKGROUND

Optical networks employing wavelength division multiplexing (WDM) technology have come to be widely used as the demand for communication capacity has grown. WDM technology is used to multiplex and transmit a plurality of optical signals having different wavelengths.

Optical branching and insertion devices, which are also referred to as reconfigurable optical add-drop multiplexers (ROADM) and so on, are known transmission devices that employ WDM technology. Optical branching and insertion devices have optical-signal receiver/transmitters, which are also referred to as transponders and so on.

Optical branching and insertion devices multiplex optical signals of an arbitrary wavelength input from a receiver/transmitter, and transmit the multiplexed optical signals to other nodes. Furthermore, optical branching and insertion devices receive optical signals multiplexed by other nodes, separate optical signals of an arbitrary wavelength, and output the separated optical signals by way of a receiver/transmitter. In other words, optical branching and insertion devices insert and branch optical signals of an arbitrary wavelength. The wavelengths of the optical signals that are inserted and branched are set by a network management device coupled to an optical branching and insertion device.

Optical branching and insertion devices are provided with an optical cross-connect device in which an optical amplifier and a wavelength selective switch (WSS) are provided for each path so that multiplexed optical signals are transmitted between different paths. Here, a path is a transmission path extending to another node with which connection is to be made.

Wavelength selective switches select a specific wavelength from a multiplexed optical signal, and output the optical signal of the selected wavelength from an arbitrary port. Wavelength selective switches, conversely, also multiplex and output optical signals input from an arbitrary port.

Wavelength selective switches have a filter passband centered on the frequency corresponding to a selected wavelength. If a plurality of optical branching and insertion devices are coupled, the cumulative filter passband narrows, and the spectral width of the optical signal is therefore reduced. Consequently, the transmission characteristics of the optical signal deteriorate each time the optical signal passes through an optical branching and insertion device. The spectral width of the optical signal increases as the bit rate increases, in accordance with the modulation scheme of the optical signal. Consequently, for example, if a high-speed optical signal of 40 Gbps or 100 Gbps and so on is transmitted, the spectral width of the transmitted optical signal increases, the wide-range spectrum is consequently cut due to filtering at a plurality of stages, and there arises a problem in that the error rate worsens.

In relation to the narrowing of the spectrum of an optical signal, Japanese Laid-open Patent Publication No. 2010-98544, for example, discloses technology with which the filter passband of a wavelength selective switch is controlled. This technology employs a wavelength selective switch with which it is possible to seamlessly adjust the characteristics of a filter passband for allowing optical signals of each wavelength to pass.

The aforementioned technology performs band control in the wavelength selective switch in such a way that narrow passbands and wide passbands are adjacent to one another in an alternating manner. Consequently, the problem of crosstalk arises between optical signals having adjacent wavelengths. In other words, side-lobe components of the spectrum of an optical signal that is branched in a specific node propagate to adjacent nodes, and as a result a problem arises in that transmission characteristics deteriorate.

The aforementioned technology determines the passband of a wavelength selective switch in accordance with network parameters such as the number of nodes through which the optical signal of each wavelength passes. Therefore, computational processing may become complex in a management device of a network management system (NMS) or the like.

SUMMARY

According to an aspect of the invention, an optical branching and insertion device includes an optical splitter that branches an input optical signal, and outputs the branched optical signal from a first output port and a second output port; a wavelength selective switch that allows passage of an optical signal of a predetermined wavelength from among optical signals input to a first input port from the first output port, and outputs the optical signal of the predetermined wavelength and an optical signal inputted from a second input port; and a processor that executes a process to expand a band through which the optical signal of the predetermined wavelength is allowed to pass, the process being executed when a channel allocated to a wavelength of the optical signal inputted from the second input port and a channel allocated to the predetermined wavelength are not adjacent.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a table representing an example of a settings table;

FIG. 10 is a table indicating determination conditions in relation to whether or not the expansion of a filter passband is possible;

DESCRIPTION OF EMBODIMENTS

Figure 1:
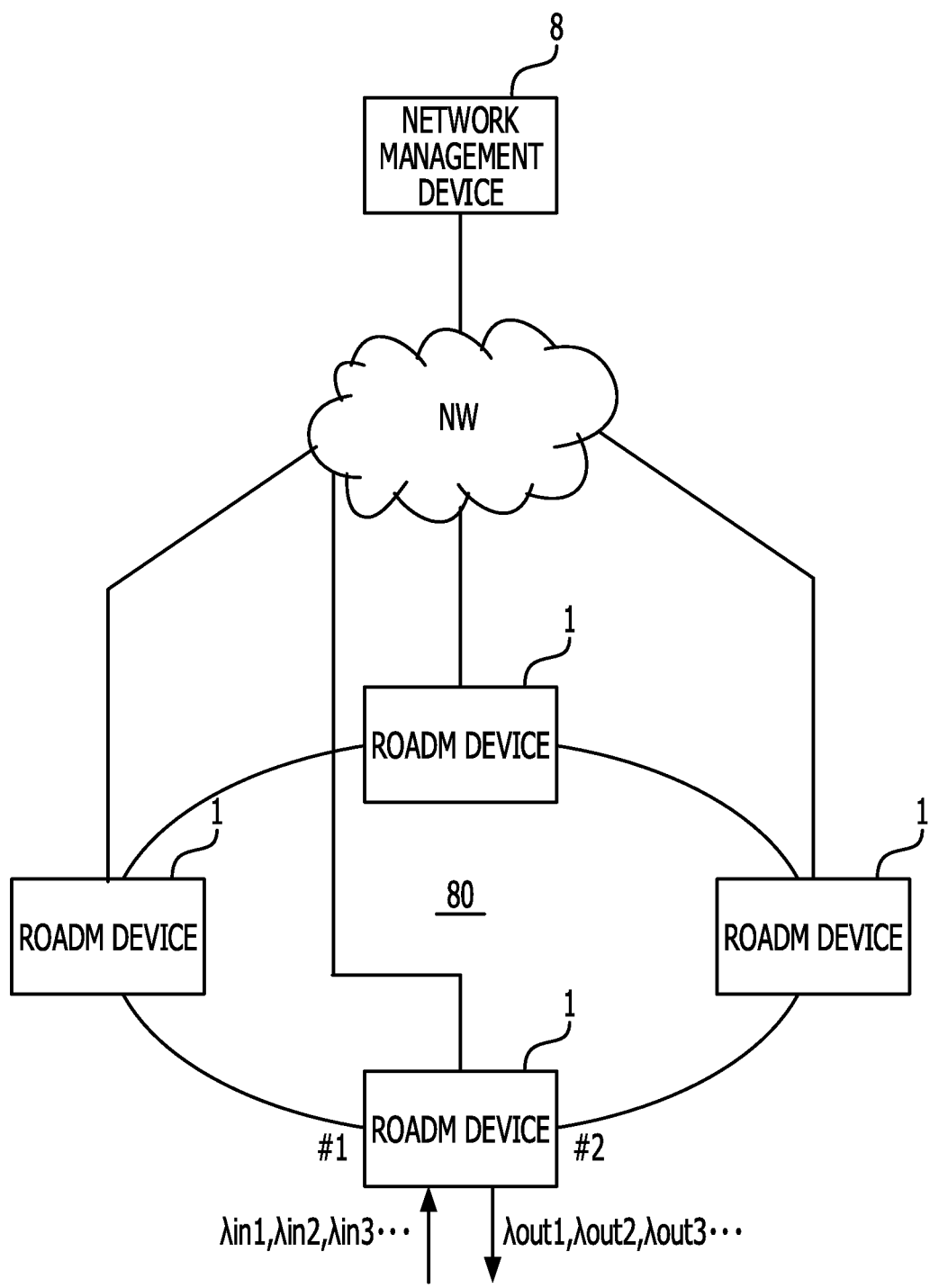
FIG. 1 is a drawing depicting an example of a network of ROADM devices.

FIG. 1 is a drawing depicting an example of a network of ROADM devices, which are optical branching and insertion devices. The ROADM devices 1 are coupled to each other by optical fibers, and make up a ring-type network 80, for example. Each ROADM device 1 has two paths #1 and #2 that join the ROADM device 1 to the ROADM devices 1 adjacent on either side thereof. The network 80 is not restricted to the form depicted in FIG. 1, and two ring-type networks may be coupled by way of a connection node, for example. In this case, a ROADM device provided in the connection node has four paths.

A network management device 8 is, for example, an NMS and manages the ROADM devices 1 within the network 80. The network management device 8 is coupled to the ROADM devices 1 by way of a monitoring and control network NW such as a local area network (LAN).

The ROADM devices 1 have optical signals of wavelengths $\lambda in1$, $\lambda in2$, $\lambda in3$ . . . input thereto, and the optical signals are subjected to wavelength multiplexing and are transmitted within the network 80. The ROADM devices 1 separate optical signals of wavelengths $\lambda out1$, $\lambda out2$, $\lambda out3$ . . . from wavelength light and output these optical signals.

Therefore, the optical signals are transmitted between any of the ROADM devices 1 by using the network management device 8 to allocate a channel for each wavelength of the optical signals input to and output from the ROADM devices 1a to 1g. In the following description, the input of the optical signals $\lambda in1$, $\lambda in2$, $\lambda in3$ . . . from outside to a ROADM device 1 is referred to as "insertion", and the output of the optical signals $\lambda out1$, $\lambda out2$, $\lambda out3$ . . . from a ROADM device 1 to outside is referred to as "branching". Light for which optical signals of a plurality of wavelengths have been multiplexed is referred to as "multiplexed light", and bands allocated to wavelengths are referred to as "channels".

Figure 2:
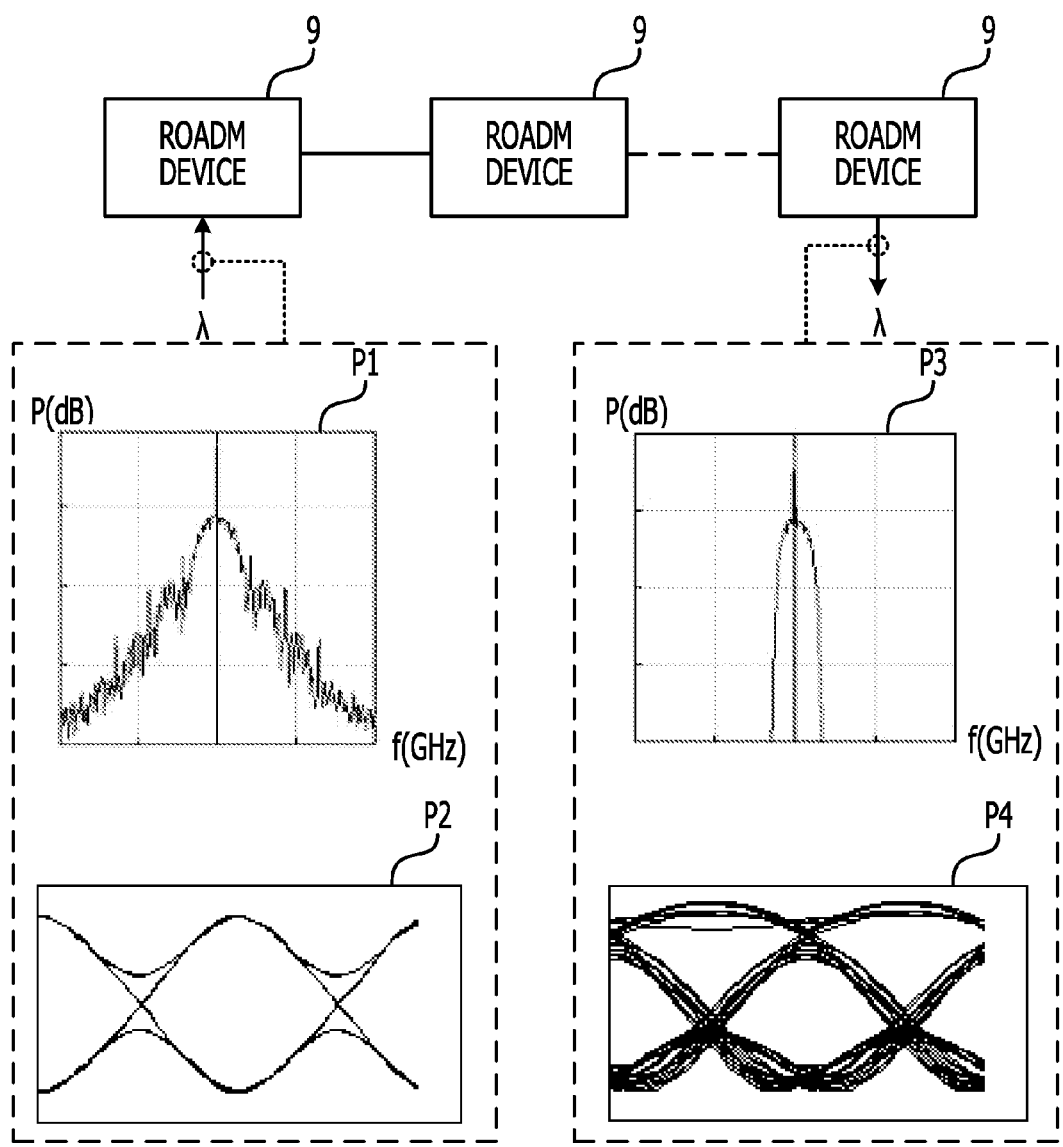
FIG. 2 is a drawing depicting the transmission characteristics of ROADM devices according to a comparative example.

FIG. 2 is a drawing depicting the transmission characteristics of ROADM devices according to a comparative example. Graphs P1 to P4 depict characteristics of when a 40-Gbps optical signal is transmitted in a transmission path joining 24 ROADM devices 9. Graphs P1 and P2 respectively depict the spectrum and eye pattern of an optical signal of wavelength $\lambda$ when the optical signal is inserted to a transmission-node ROADM device 9. Graphs P3 and P4, on the other hand, respectively depict the spectrum and eye pattern of the aforementioned optical signal when the optical signal is branched from reception-node ROADM device 9.

Graphs P1 and P2 indicate that the spectrum of the optical signal narrows due to the filter passband characteristics of the wavelength selective switches of the plurality of ROADM devices 9. As the spectrum narrows, the eye pattern of the optical signal also deteriorates as depicted in graphs P2 and P4, and as a result there is deterioration in transmission path characteristics such as there being an increase in the error rate.

Figure 3:
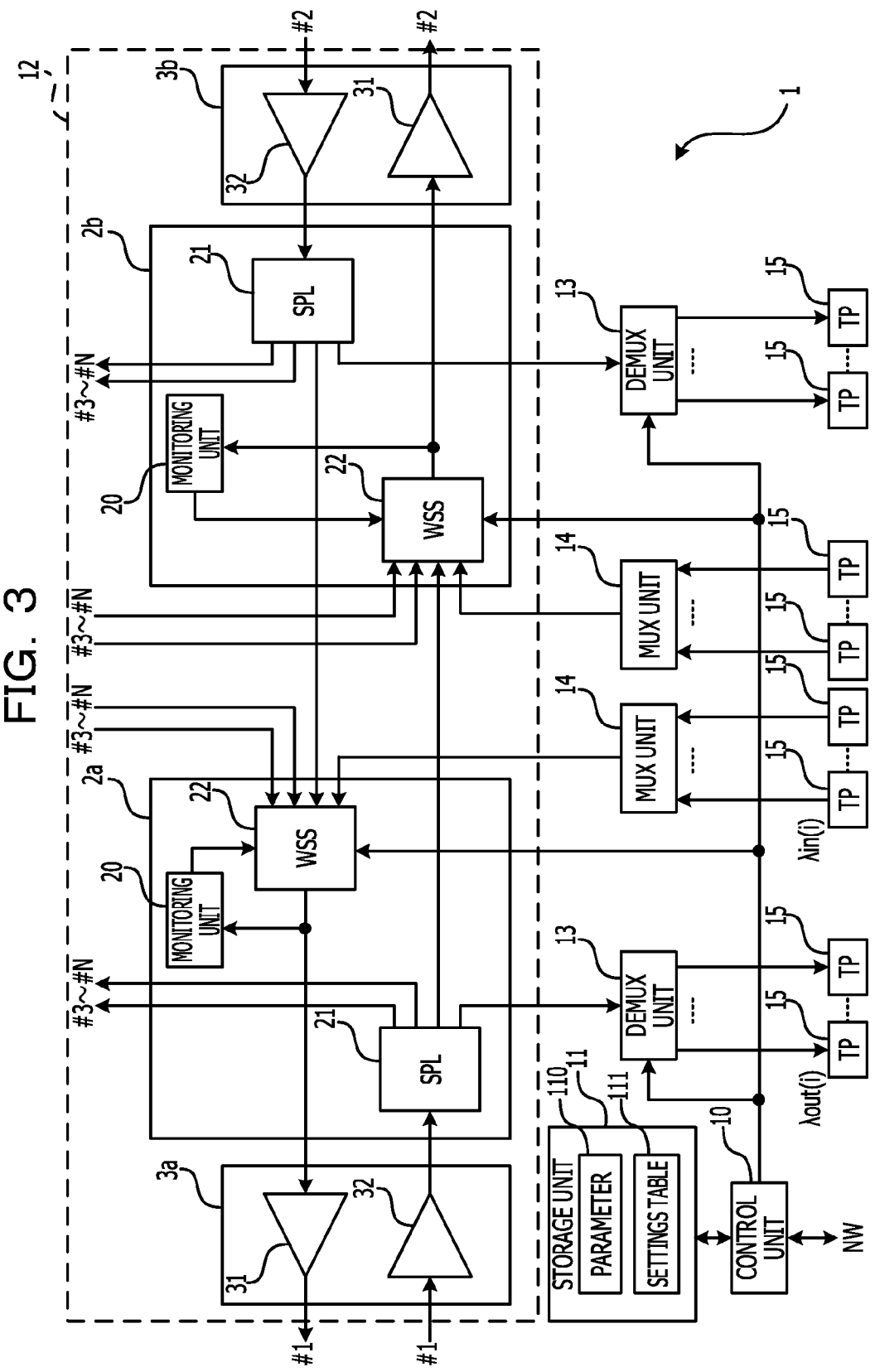
FIG. 3 is a drawing depicting a ROADM device according to an embodiment.

FIG. 3 is a drawing depicting a ROADM device 1 according to an embodiment. A ROADM device 1 has a control unit 10, a storage unit 11, an optical cross-connect unit 12, a plurality of DEMUX units 13, a plurality of MUX units 14, and a plurality of receiver/transmitters (TP) 15. The optical cross-connect unit 12 includes a plurality of amplification units 3a and 3b and a plurality of switch units 2a and 2b provided on each path #1 to #N. FIG. 3 depicts only the amplification units 3a and 3b and the switch units 2a and 2b corresponding to each of the paths #1 and #2, but amplification units and switch units corresponding to other paths also have the same configuration.

The amplification units 3a and 3b each include an input-side amplifier 32 that amplifies multiplexed light input from paths #1 and #2, and an output-side amplifier 31 that amplifies multiplexed light to be output to paths #1 and #2. The switch units 2a and 2b each have an optical splitter (SPL) 21, a wavelength selective switch (WSS) 22, and a monitoring unit 20.

The optical splitter 21 subjects light, which is input to an input port, to power branching, and outputs the branched light from a plurality of output ports. In other words, the optical splitter 21 functions as a branching unit that branches an input optical signal, and outputs the branched optical signal from a plurality of output ports. The optical splitter 21 is used as a branching unit in the present embodiment, but another device that subjects multiplexed light to power branching may be used instead. Furthermore, an optical signal of a desired wavelength alone may be branched by using a wavelength selective switch or the like instead of a device capable of power branching.

The input port of the optical splitter 21 is coupled to the input-side amplifier 32, whereas the plurality of output ports are coupled to a DEMUX unit 13 and to the wavelength selective switches 22 of another path #1 to #N. The optical splitter 21 outputs multiplexed light input from the input-side amplifier 32, to the DEMUX unit 13 and to the wavelength selective switch 22 of the other path #1 to #N.

The wavelength selective switch 22 selects a wavelength by having a plurality of optical signals input thereto from each of a plurality of input ports, and allowing an optical signal of a desired wavelength to pass therethrough. The wavelength selective switch 22 multiplexes an optical signal of the selected wavelength and outputs the multiplexed optical signal from an output port.

The plurality of input ports of the wavelength selective switch 22 are coupled to a MUX unit 14 and to the optical splitter 21 of the other path #1 to #N, whereas the output port is coupled to the output-side amplifier 31. The wavelength selective switch 22 multiplexes an optical signal input (inserted) from the MUX unit 14 and an optical signal of the selected wavelength, and outputs the multiplexed optical signals to the corresponding path #1 to #N by way of the output-side amplifier 31. In other words, the wavelength selective switch 22 functions as an insertion unit that allows passage of an optical signal of a predetermined wavelength from among multiplexed light (optical signals) input to the input ports thereof from the output port of the optical splitter 21, and that outputs the optical signal of the predetermined wavelength and an optical signal inserted from another input port.

The wavelength selective switch 22 selects one or more wavelengths for each input port based on settings from the control unit 10. The wavelength selective switch 22 is, for example, a liquid crystal-type WSS provided with LCOS having a two-dimensional pixel configuration.

Figure 4:
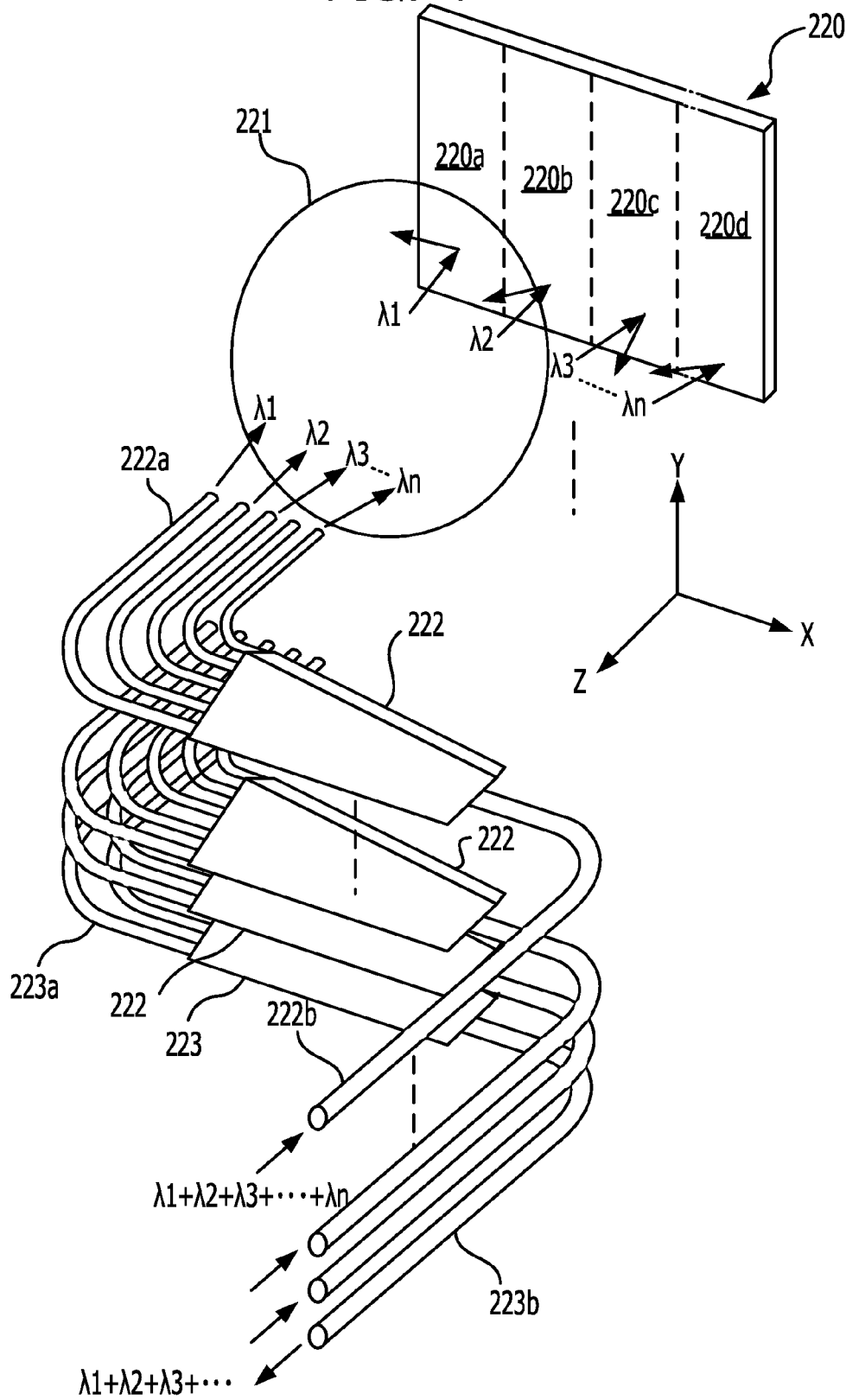
FIG. 4 is a perspective view depicting the configuration of a wavelength selective switch.

FIG. 4 is a perspective view depicting the configuration of the wavelength selective switch 22. The wavelength selective switch 22 includes LCOS 220, a lens 221, and a plurality of arrayed waveguides (AWG; arrayed waveguide gratings) 222 and 223. The plurality of arrayed waveguides 222 and 223 have a plurality of first ports 222a and 223a and have second ports 222b and 223b for inputting and outputting optical signals. The plurality of arrayed waveguides 222 and 223 make up a layered arrayed waveguide having a layered configuration, and the number of layers thereof corresponds to the number of ports of the wavelength selective switch 22.

The wavelength selective switch 22 in the present embodiment is an ADD-type wavelength selective switch. Therefore, the wavelength selective switch 22 has optical signals input thereto from each of the second ports 222b of the plurality of arrayed waveguides 222, selects an optical signal of one or more wavelengths from among the input optical signals, and outputs the selected optical signal from the second port 223b of the arrayed waveguide 223. That is, the second ports 222b of the arrayed waveguides 222 function as input ports for the wavelength selective switch 22, whereas the second port 223b of the arrayed waveguide 223 functions as an output port for the wavelength selective switch 22.

In the arrayed waveguides 222, when multiplexed light of a plurality of wavelengths $\lambda 1, \lambda 2, \lambda 3 \ldots \lambda n$ is input from the second ports 222b, the multiplexed light is separated according to each wavelength and output from each of the plurality of output ports 222a. The light of wavelengths $\lambda 1, \lambda 2, \lambda 3 \ldots \lambda n$ passes through the lens 221, and thereby forms an image in different regions 220a to 220d of the LCOS 220.

The LCOS 220 functions as a filter unit that allows passage of an optical signal of a predetermined wavelength from among the optical signals input to the input ports 222b. The light of wavelengths $\lambda 1, \lambda 2, \lambda 3 \ldots \lambda n$ is subjected to phase modulation in the regions 220a to 220d, and diffraction angles are thereby controlled. As a result, the wavelength selective switch 22 is able to select an optical signal of a predetermined wavelength from among the plurality of wavelengths $\lambda 1, \lambda 2, \lambda 3 \ldots \lambda n$, and output the selected optical signal to the arrayed waveguide 223 from the first port 223a. The light of the wavelengths output to the arrayed waveguide 223 is multiplexed and output from the output port 223b as multiplexed light.

As previously mentioned, the wavelength selective switch 22 allows passage of an optical signal of a predetermined wavelength from among optical signals input to the input ports from output ports of the optical splitter 21, and the wavelength selective switch 22 outputs the optical signal of the predetermined wavelength and an optical signal inserted from another input port. Therefore, the optical signal of the predetermined wavelength that has passed through the filter unit, and the optical signal that has been input (inserted) from the other input port are output from the output port 223b.

Figure 5:
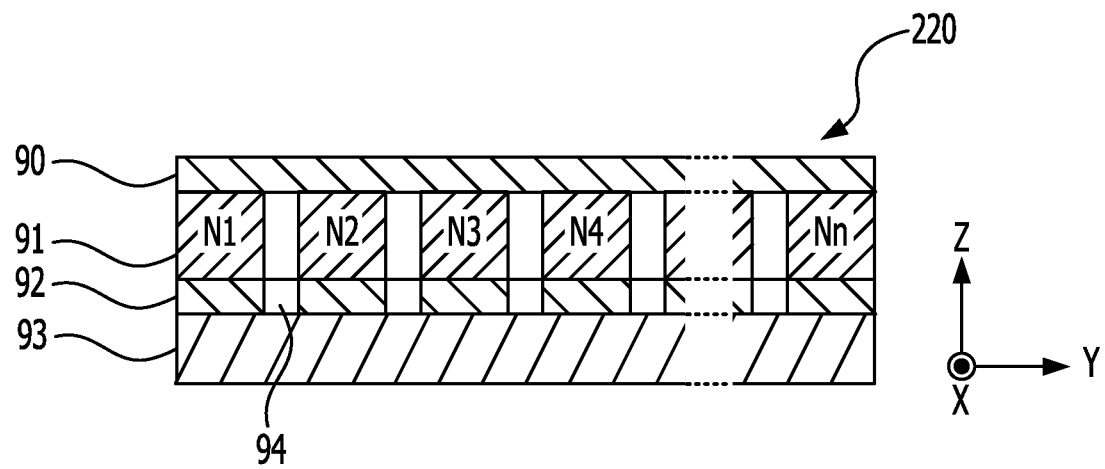
FIG. 5 is a cross-sectional view depicting a cross section of liquid crystal on silicon (LCOS)

FIG. 5 is a cross-sectional view depicting a cross section of the LCOS 220. The LCOS 220 includes an upper electrode layer 90, a liquid crystal layer 91, a lower electrode layer 92, and a silicon substrate 93. The layered configuration depicted in FIG. 5 is the same for the regions 220a to 220d.

The lower electrode layer 92, the liquid crystal layer 91, and the upper electrode layer 90 are stacked in this order on the surface of the silicon substrate 93. The upper electrode layer 90 is, for example, a transparent conductive film of indium tin oxide (ITO) or the like, and is provided with a common potential such as ground. The liquid crystal layer 91 is divided into a plurality of cells N1 to Nn by insulating gap sections 94.

The lower electrode layer 92 is also divided by the gap sections 94, into electrodes corresponding to each of the plurality of cells N1 to Nn. The lower electrode layer 92 not only functions as electrodes in order to apply a voltage to the cells N1 to Nn, but also functions as a mirror that reflects incident signal light.

Figure 6:
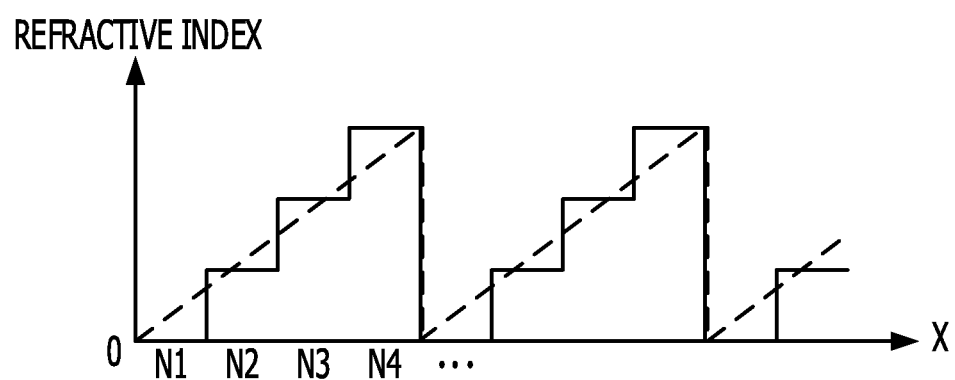
FIG. 6 is a graph depicting an example of the refractive-index distribution of the LCOS.

The refractive index of the liquid crystal layer 91 is modulated in response to the voltage applied by way of the lower electrode layer 92 in accordance with the control performed by the control unit 10. An arbitrary refractive index distribution is formed by this refractive index modulation being performed for each cell N1 to Nn. FIG. 6 is a graph depicting an example of the refractive index distribution of the LCOS 220. In FIG. 6, the dashed lines indicate the equivalent refractive index. The horizontal axis represents the positions of the cells N1 to Nn.

In this example, the refractive index of the cells N1 to Nn is distributed in such a way that the refractive index increases in stages in the X direction. Furthermore, this increase pattern is periodically repeated. By forming the refractive index distribution in this way, the LCOS 220 is able to subject incident light to phase modulation, and reflect the light to any angle. The reflection characteristics of an optical signal affect the width of the band through which the optical signal passes. Therefore, the LCOS 220 is capable of not only selecting a wavelength (the aforementioned predetermined wavelength) to be allowed to pass, but is also capable of controlling the band (filter passband) through which an optical signal of the wavelength is allowed to pass, with this control being performed in pixel units (that is, units of cells N1 to Nn).

With reference again to FIG. 3, the monitoring unit 20 monitors whether or not there is an optical signal that is output from the output port of the wavelength selective switch 22, and monitors power. The monitoring unit 20 adjusts power with respect to the wavelength selective switch 22 by adjusting the amount of attenuation of each wavelength, namely of each channel. An optical signal output from the output port of the wavelength selective switch 22 is branched by a splitter or the like, and is input to the monitoring unit 20.

The DEMUX units 13 function as separation units that, in order to demultiplex multiplexed light, separate multiplexed light input from a predetermined path #1 to #N, into an optical signal of each frequency and output the optical signals to outside. The DEMUX units 13 are coupled to a plurality of receiver/transmitters 15, and have a tunable filter corresponding to each receiver/transmitter 15. The DEMUX units 13 separate, from multiplexed light input from an optical splitter 21, optical signals of wavelengths selected by means of the tunable filters, and output the optical signals to the receiver/transmitters 15. The selection of a wavelength in the tunable filters is performed for each corresponding receiver/transmitter 15 in accordance with the settings of the control unit 10. The optical signals output to the receiver/transmitters 15 are output to an external device. The tunable filters may be provided in a reception processing unit of the receiver/transmitters 15.

In order to insert an optical signal, the MUX units 14 are coupled to a plurality of receiver/transmitters 15, and output, to an input port of a wavelength selective switch 22, optical signals that have been input by way of the receiver/transmitters 15 from an external device. The MUX units 14 include an arrayed waveguide grating and so on. The MUX units 14 group together optical signals from the plurality of receiver/transmitters 15, and output the optical signals to the wavelength selective switch 22.

The control unit 10 is, for example, a processor. To be specific, the control unit 10 is a computational processing circuit such as a central processing unit (CPU), and controls ROADM devices 1 based on a predetermined program. The control unit 10 communicates with the network management device 8 by way of the monitoring and control network NW. The control unit 10 is not restricted to functioning by means of software in this way, and may also function by means of hardware such as an integrated circuit intended for a specific use.

The storage unit 11 is, for example, memory. The storage unit 11 stores a parameter 110 relating to the transmission performance of the ROADM device 1, and stores a settings table 111 in which settings for the wavelengths of optical signals are registered. The control unit 10 refers to the settings table 111, and implements settings with respect to the wavelength selective switches 22 and the DEMUX units 13.

The control unit 10 implements settings for the selected wavelength and settings for a filter passband, with respect to the wavelength selective switches 22. The wavelength selective switches 22 have a filter passband centered on the central frequency of a selected wavelength, namely a channel.

Figure 7:
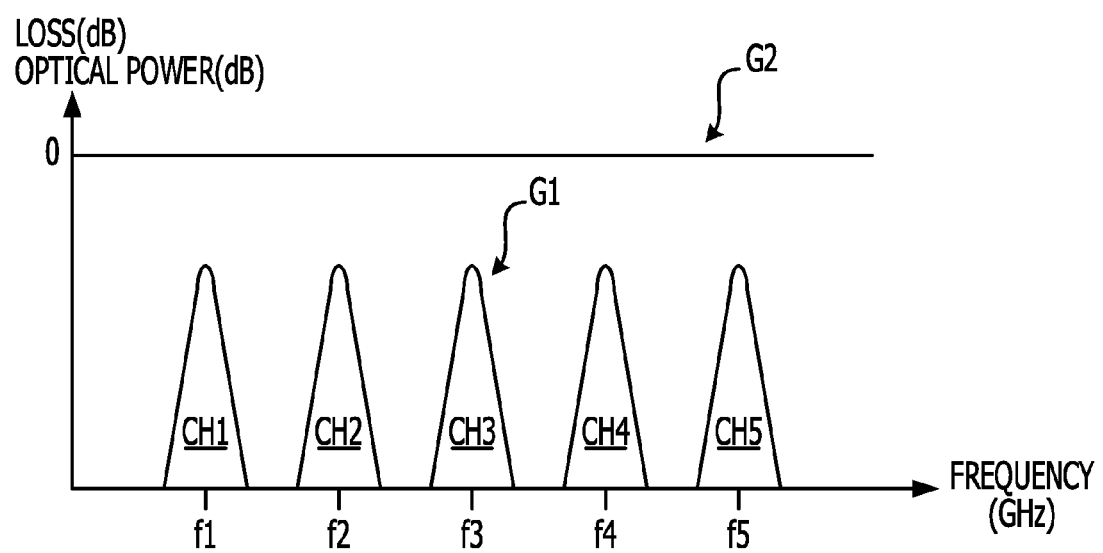
FIG. 7 is a graph depicting an example of the spectrum of each channel and the filter passband characteristics of a wavelength selective switch in the case there are no unused channels.

FIG. 7 is a graph depicting an example of the spectra of optical signals occupying channels and the filter passband characteristics of a wavelength selective switch 22 in the case there are no unused channels. In this example, it is assumed that wavelengths allocated to each of channels CH1 to CH5 are selected in the wavelength selective switch 22. Graph G1 indicates spectral characteristics as changes in optical power (dB) with respect to frequency (GHz) for each optical signal occupying channels CH1 to CH5. The spectra of the optical signals occupying channels CH1 to CH5 have a uniform width centered on the central frequencies f1 to f5. The spectral widths are determined in accordance with the transmission speed of the optical signals.

Graph G2 indicates the filter passband characteristics of the wavelength selective switch 22 as changes in loss (dB) with respect to frequency (GHz). Channels CH1 to CH5 have wavelengths allocated thereto with uniform intervals therebetween, and are adjacent to each other on the frequency axis. Therefore, the filter passbands of the wavelength selective switch 22 become a series of wide bands due to the integration of the passbands that allow passage of optical signals of the wavelengths allocated to channels CH1 to CH5. Consequently, in this example, the problem of the narrowing of the spectra of the aforementioned optical signals does not arise.

Figure 8:
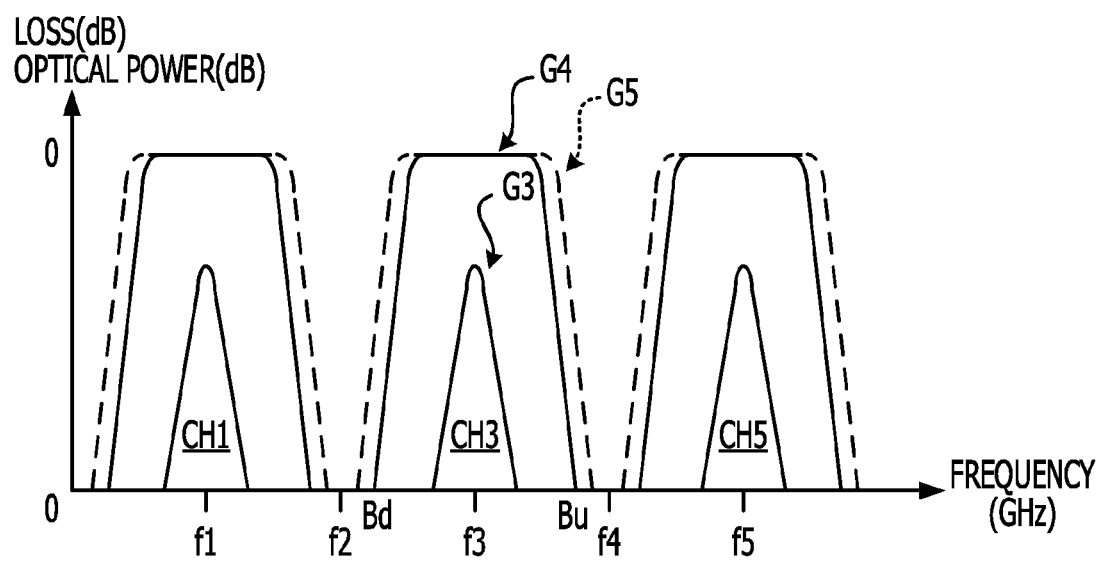
FIG. 8 is a graph depicting an example of the spectrum of each channel and the filter passband characteristics of a wavelength selective switch in the case there is an unused channel.

FIG. 8, on the other hand, is a graph depicting an example of the spectra of optical signals occupying channels and the filter passband characteristics of a wavelength selective switch 22 in the case there are unused channels. In this example, it is assumed that, in the wavelength selective switch 22, wavelengths allocated to each of channels CH1, CH3, and CH5 are selected, and wavelengths allocated to channels CH2 and CH4 are not selected. Graph G3 indicates spectral characteristics. Graph G4 indicates filter passband characteristics.

In FIG. 8, channels CH2 and CH4 are not used. Therefore, the filter passbands that allow passage of the optical signals of the wavelengths allocated to channels CH1, CH3, and CH5 are discontinuous bands centered on the central frequencies f1, f3, and f5. Portions of the bands partially overlap the bandwidths of the unused channels CH2 and CH4. Accordingly, the aforementioned problem of the narrowing of the spectra arises when adjacent channels are not present as in this example.

In order to avoid this problem, the control unit 10 expands the filter passbands as indicated by graph G5. For example, channels CH2 and CH4 that are adjacent on either side of channel CH3 on the frequency axis are not used. Therefore, the control unit 10 expands the filter passband (see dashed lines) by adjusting the upper limit Bu and the lower limit Bd of the filter passband that allows passage of the optical signal of the wavelength allocated to channel CH3.

The expansion of the passband is, for example, performed by controlling the LCOS within the wavelength selective switch 22 in pixel units, as previously mentioned. A wavelength selective switch having LCOS is capable of freely controlling the passband of a filter without being dependent upon a grid of fixed wavelengths (frequencies). The wavelength selective switch 22 is not restricted to being a liquid crystal type, and may also be a Digital Light Processing (DLP) type, for example.

The control unit 10 may expand the filter passbands of the wavelength selective switch 22 in accordance with a parameter 110 relating to the transmission performance of the ROADM device 1. The parameter 110 is, for example, transmission speed, transmission distance, variance, or the number of transmission paths (number of spans). For example, the control unit 10 preferably adjusts the number of pixels to be controlled, in accordance with transmission speed. In this way, the bandwidth to be expanded is adjusted in accordance with the parameter 110 relating to transmission performance, and optimal transmission characteristics corresponding to the transmission performance are obtained.

The control unit 10 may expand a filter passband of the wavelength selective switch 22 by adjusting at least one of the upper limit Bu and the lower limit Bd of the filter passband. In this case, in the example in FIG. 8, when channel CH2 is used and channel CH4 is not used, the control unit 10 adjusts only the upper limit Bu of the filter band that allows passage of the optical signal of the wavelength allocated to channel CH3, and the filter passband is thereby expanded. On the other hand, when channel CH2 is not used and channel CH4 is in use, the control unit 10 adjusts only the lower limit Bd of the filter band that allows passage of the optical signal of the wavelength allocated to channel CH3, and the filter passband is thereby expanded. Due to this control, the filter passband may be flexibly controlled in accordance with the allocation of channels to the wavelengths.

When the control unit 10 controls the aforementioned filter passband, the control unit 10 determines whether or not the control may be performed, in accordance with the setting details for the adjacent wavelengths, in order to avoid any influence between adjacent wavelengths. The setting details for each wavelength are recorded in the settings table 111.

An example of the settings table 111 is depicted in FIG. 9. The contents of the settings table 111 are registered and updated by way of the control unit 10 based on settings from the network management device 8.

The "channel" column indicates identification information for each channel. The "wavelength" column indicates wavelengths $\lambda 1$, $\lambda 2$, $\lambda 3$ . . . allocated to the channels. The wavelengths are set with a uniform interval therebetween. This interval, when expressed as a frequency, is 50 GHz for example.

The "input source path" column indicates input source paths #1 to #N through which an optical signal of the wavelength in question is input as multiplexed light. The "output destination path" column indicates output destination paths #1 to #N through which an optical signal of the wavelength in question is output as multiplexed light.

The "settings" column indicates setting details for an optical signal of the wavelength in question. The "pass" setting is a setting to guide an optical signal of the wavelength in question from an "input source path" to an "output destination path" by way of a wavelength selective switch 22. An optical signal of a wavelength having the "pass" setting is guided from a predetermined path to another path via an input-side amplifier 32, a splitter 21, a wavelength selective switch 22, and an output-side amplifier 31 in this order. In this case, the control unit 10 implements settings with respect to the wavelength selective switch 22 so that the wavelength in question is selected.

The "insert" setting is a setting to input an optical signal of the wavelength in question from a MUX unit 14 to a wavelength selective switch 22 and to perform multiplexing. An optical signal of a wavelength having the "insert" setting is guided from outside to another path via a receiver/transmitter 15, a MUX unit 14, a wavelength selective switch 22, and an output-side amplifier 31 in this order. In this case, the control unit 10 implements settings with respect to the wavelength selective switch 22 so that the wavelength in question is selected.

The "branch" setting is a setting to separate an optical signal of the wavelength in question by means of a DEMUX unit 13. An optical signal of a wavelength having the "branch" setting is guided from a predetermined path #1 to #N to outside via an input-side amplifier 32, a splitter 21, a DEMUX unit 13, and a receiver/transmitter 15 in this order. In this case, the control unit 10 implements settings with respect to a predetermined tunable filter of the DEMUX unit 13 so that the wavelength in question is selected. An optical signal of a wavelength having the "branch" setting is blocked in such a way that the side-lobe components of the spectrum of the wavelength light are not allowed to propagate to an adjacent ROADM device 1 within the network 80, and the optical signal is therefore not selected in a wavelength selective switch 22.

The "not used" setting is a setting to set the channel in question so as to not be used. That is, a wavelength allocated to a channel that has the "not used" setting is not used. It is also possible to set a channel to which a wavelength has not been allocated as "not used".

Wavelength light that is transmitted by a channel allocated to a wavelength having the "not used" setting is not input to or output from a ROADM device 1. A wavelength having the "not used" setting is blocked in such a way that the optical signal of the wavelength is not transmitted to an adjacent ROADM device 1 within the network 80, and the wavelength is therefore not selected in a wavelength selective switch 22.

In the example in FIG. 9, the pass setting is implemented for the optical signals of the wavelengths allocated to channels CH4, CH6, CH7, and CH9, so that the optical signals pass from path #1 to path #2. The insert setting is implemented for the optical signals of the wavelengths allocated to channels CH2 and CH10, so that the optical signals are inserted from outside and output to path #2. The branch setting is implemented for the optical signals of the wavelengths allocated to channels CH1 and CH8, so that the optical signals are branched from multiplexed light input from path #1 and output to outside. The not-used setting is implemented for the optical signals of the wavelengths allocated to channels CH3 and CH5, so that the optical signals are not input to or output from the ROADM device 1. FIG. 9 represents only an example of settings with respect to the course from outside or from path #1 to path #2. However, same settings also exist with respect to other courses.

The control unit 10 refers to the settings table 111, and determines whether or not expansion is possible for each filter passband that allows passage of a wavelength set to channel CHi. FIG. 10 indicates decisions in relation to whether or not the expansion of a filter passband is possible.

In FIG. 10, an expansion possible ("OK") decision or an expansion not-possible ("NG") decision is indicated for each combination of settings for wavelengths allocated to each set of channels CHi and CHi±1 adjacent to each other on the frequency axis (see FIG. 7 and FIG. 8) for the filter passband characteristics of a wavelength selective switch 22. The optical signal of the wavelength allocated to channel CHi (CHi±1) having the pass setting is targeted for filter passband expansion. The aforementioned narrowing of the spectra of an optical signal is the result of the optical signal passing through a plurality of wavelength selective switches 22.

The filter passband is expanded if the wavelength of channel CHi±1 (CHi) adjacent to channel CHi (CHi±1) that is allocated to the target wavelength has the not-used setting. Processing for the expansion of a filter passband by the control unit 10 will hereafter be explained in detail.

If a channel allocated to the wavelength of an optical signal having the insert setting, and a channel allocated to the optical signal of a wavelength having the pass setting are not adjacent, the control unit 10 expands the band that allows passage of the optical signal of the wavelength having the pass setting. That is, if the settings for the wavelengths allocated to the adjacent set of channels CHi and CHi±1 are the pass setting and the insert setting, the control unit 10 does not expand the filter passband corresponding to the wavelength of the channel having the pass setting.

As a result of this, crosstalk, which occurs between the optical signal of the wavelength allocated to the channel having the insert setting and the optical signal of the wavelength allocated to the channel having the pass setting, and the narrowing of filter passbands are avoided. Consequently, it is possible to sufficiently ensure the filter passband of the optical signal during insertion, and transmission characteristics when the optical signal passes through a multistage optical branching and insertion device 1 are improved.

If a channel allocated to the wavelength of an optical signal having the branch setting, and a channel allocated to the optical signal of a wavelength having the pass setting are not adjacent, the control unit 10 expands the band that allows passage of the optical signal of the wavelength having the pass setting. That is, if the settings for the wavelengths allocated to the adjacent set of channels CHi and CHi±1 are the pass setting and the branch setting, the control unit 10 does not expand the filter passband corresponding to the wavelength of the channel having the pass setting. For example, in the example depicted in FIG. 9, CH8 and CH10, which are adjacent to CH9 that corresponds to a wavelength having the pass setting, respectively have the branch setting and insert setting, and the control unit 10 therefore does not expand the filter passband of the optical signal of the wavelength allocated to CH9.

As a result of this, crosstalk, caused by propagation to a downstream ROADM device 1 of the side lobe components of the spectrum of an optical signal of the wavelength allocated to the channel having the branch setting, and signal deterioration are avoided. In the present embodiment, the optical splitter 21 is employed as a branching unit, and therefore the optical signal of the wavelength having the branch setting is input to the wavelength selective switch 22, which is an insertion unit. On the other hand, if the wavelength selective switch is employed as a branching unit, the optical signal having the branch setting is not input to the insertion unit 22. Consequently, in this case, the control unit 10 handles the optical signal of the wavelength having the branch setting, as an optical signal of a wavelength having the not-used setting. The control unit 10 may expand the filter passband of the optical signal as long as the wavelengths allocated to the channels adjacent thereto have the pass setting.

Furthermore, if a channel allocated to the wavelength of an optical signal having the pass setting, and a channel allocated to the optical signal of another wavelength having the pass setting are not adjacent, the control unit 10 expands the band that allows passage of the optical signals of the wavelengths having the pass setting. In other words, if the settings for the wavelengths allocated to an adjacent set of channels CHi and CHi±1 are both pass settings, the control unit 10 does not expand the filter passbands corresponding to the wavelengths of either channel.

As described with reference to FIG. 7, this is because the problem of the narrowing of the spectrum does not arise if a plurality of channels allocated to wavelengths having the pass setting are adjacent to each other. In this case, because the filter passbands of the wavelength selective switch 22 become a series of wide bands and the expansion of a filter passband has no effect, the control unit 10 may expand the filter passband of a channel allocated to the wavelength of an optical signal having the pass setting.

As previously mentioned, the control unit 10 expands a filter passband of the wavelength selective switch 22 if the wavelength allocated to one channel CHi (CHi±1) has the pass setting and the other channel CHi±1 (CHi) has the not-used setting. With reference to FIG. 9, for example, the wavelength allocated to channel CH4 has the pass setting and channels CH3 and CH5 adjacent on either side of channel CH4 have the not-used setting, and therefore the filter passband of CH4 is expanded by adjusting both the upper limit and the lower limit of the filter passband. In addition, the wavelength allocated to channel CH6 has the pass setting and CH5 adjacent on one side of channel CH6 has the not-used setting, and therefore the filter passband of CH6 is expanded by adjusting only the lower limit Bd of the filter passband. However, although the wavelength allocated to channel CH7 has the pass setting, the adjacent channels CH6 and CH7 do not have the not-used setting, and therefore the filter passband of CH7 is not expanded.

In this way, if the channels adjacent to a channel allocated to a wavelength having the pass setting have the not-used setting, the control unit 10 expands the passband that allows passage of the optical signal of the waveband having the pass setting. In particular, if a channel allocated to the wavelength of an optical signal inserted from an input port of the wavelength selective switch 22, and a channel allocated to a predetermined wavelength selected from multiplexed light are not adjacent, the control unit 10 expands the band that allows passage of the optical signal of the predetermined wavelength. As a result, the narrowing of the spectra and the crosstalk and so on of an optical signal passing through a ROADM device 1 and an optical signal inserted to the ROADM device 1 are avoided without performing complex computational processing. In addition, the crosstalk and so on between an optical signal passing through a ROADM device 1 and an optical signal of the wavelength allocated to an adjacent channel CHi (CHi±1) may also be avoided.

Figure 11:
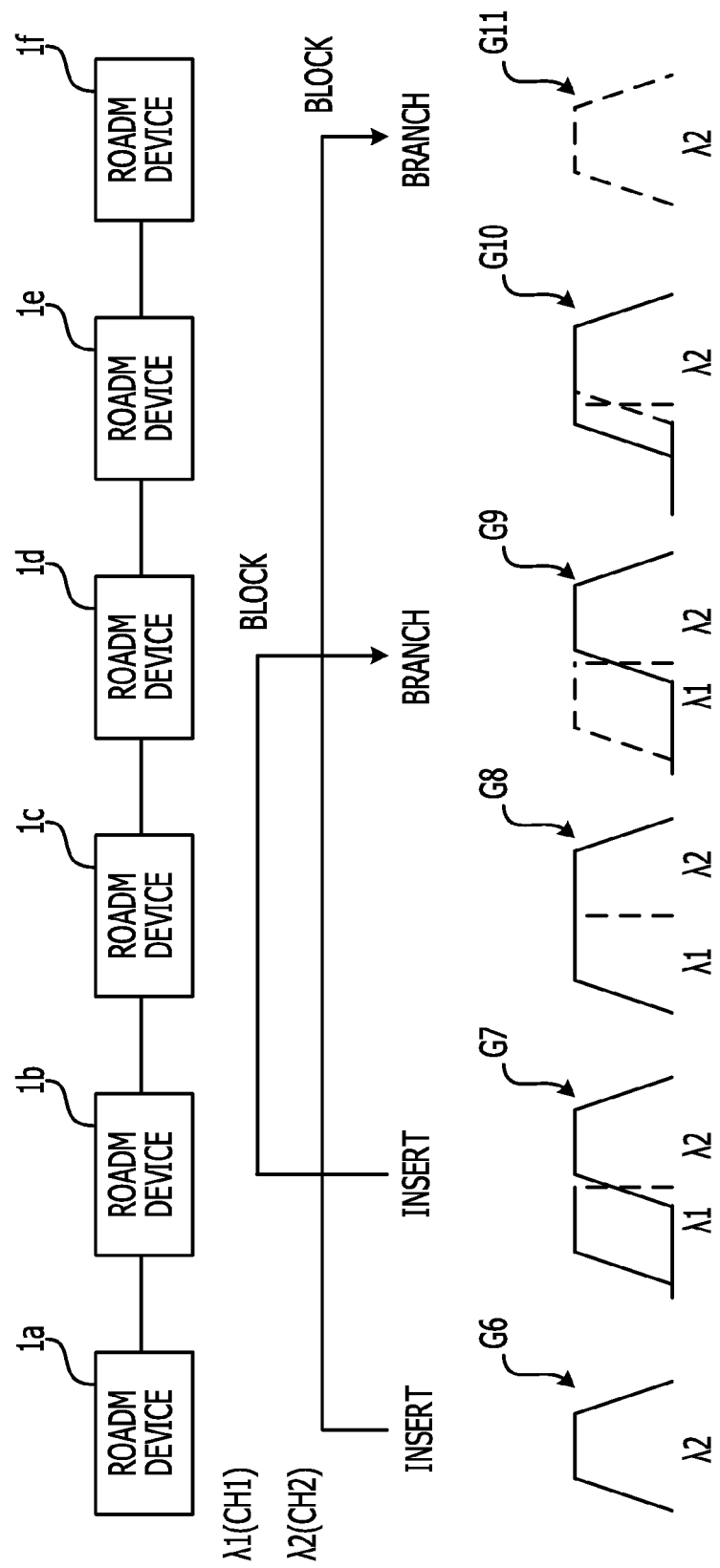
FIG. 11 is a drawing depicting an example of the expansion of a filter passband in a network.

FIG. 11 depicts an example of the expansion of a filter passband in a network. Here, an example is provided in which optical signals occupying channel CH1 that is allocated to wavelength λ1 and channel CH2 that is allocated to wavelength λ2 are transmitted between a plurality of ROADM devices 1a to 1f. Channels CH1 and CH2 are adjacent to each other on the frequency axis.

The optical signal allocated to channel CH1 is inserted to the ROADM device 1b and branched from the ROADM device 1d. The optical signal allocated to channel CH2 is inserted to the ROADM device 1a and branched from the ROADM device if.

In the ROADM device 1a, wavelength λ1 that is allocated to channel CH1 is set to the not-used setting, and wavelength λ2 that is allocated to channel CH2 is set to the insert setting. Therefore, wavelength λ2 is selected (see reference numeral G6) in the wavelength selective switch 22 of the ROADM device 1a.

In the ROADM device 1b, wavelength λ1 that is allocated to channel CH1 is set to the insert setting, and wavelength λ2 that is allocated to channel CH2 is set to the pass setting. Therefore, wavelengths λ1 and λ2 are selected (see reference numeral G7) in the wavelength selective switch 22 of the ROADM device 1b. During this process, a control unit 20 of the ROADM device 1b does not expand the band that allows passage of an optical signal of wavelength λ2, and therefore the band that allows passage of an inserted optical signal of wavelength λ1 is ensured.

In the ROADM device 1c, the wavelengths allocated to each of channels CH1 and CH2 are set to the pass setting. Therefore, wavelengths λ1 and λ2 are selected (see reference numeral G8) in the wavelength selective switch 22 of the ROADM device 1c.

In the ROADM device 1d, the wavelength allocated to channel CH1 is set to the branch setting, and the wavelength allocated to channel CH2 is set to the pass setting. Therefore, wavelength λ2 is selected and wavelength λ1 is blocked (see reference numeral G9) in the wavelength selective switch 22 of the ROADM device 1d. During this process, the control unit 20 of the ROADM device 1d does not expand the band that allows passage of the optical signal of wavelength λ2, and therefore there is no downstream leakage of the side-lobe components of the branched optical signal of wavelength λ1.

In the ROADM device 1e, channel CH1 is set to the not-used setting, and the wavelength allocated to channel CH2 is set to the pass setting. Therefore, wavelength λ2 is selected in the wavelength selective switch 22 of the ROADM device 1e. During this process, because the conditions indicated in FIG. 10 are satisfied, the band that allows passage of the optical signal of wavelength λ2 is expanded (see reference numeral G10).

In the ROADM device 1f, channel CH1 is set to the not-used setting, and wavelength λ2 allocated to channel CH2 is set to the branch setting. Therefore, wavelengths λ1 and λ2 are blocked (see reference numeral G11) in the wavelength selective switch 22 of the ROADM device 1f.

In this way, the filter passband is expanded with respect to wavelength λ2 to which channel CH2 is allocated, in the wavelength selective switch 22 in only the ROADM device 1e in which channel CH1 that is adjacent to channel CH2 is set to the not-used setting. Therefore, in this example, the transmission characteristics of the optical signals of wavelengths λ1 and λ2 that are allocated to adjacent channels CH1 and CH2 are not affected by each other and are improved.

Figure 12:
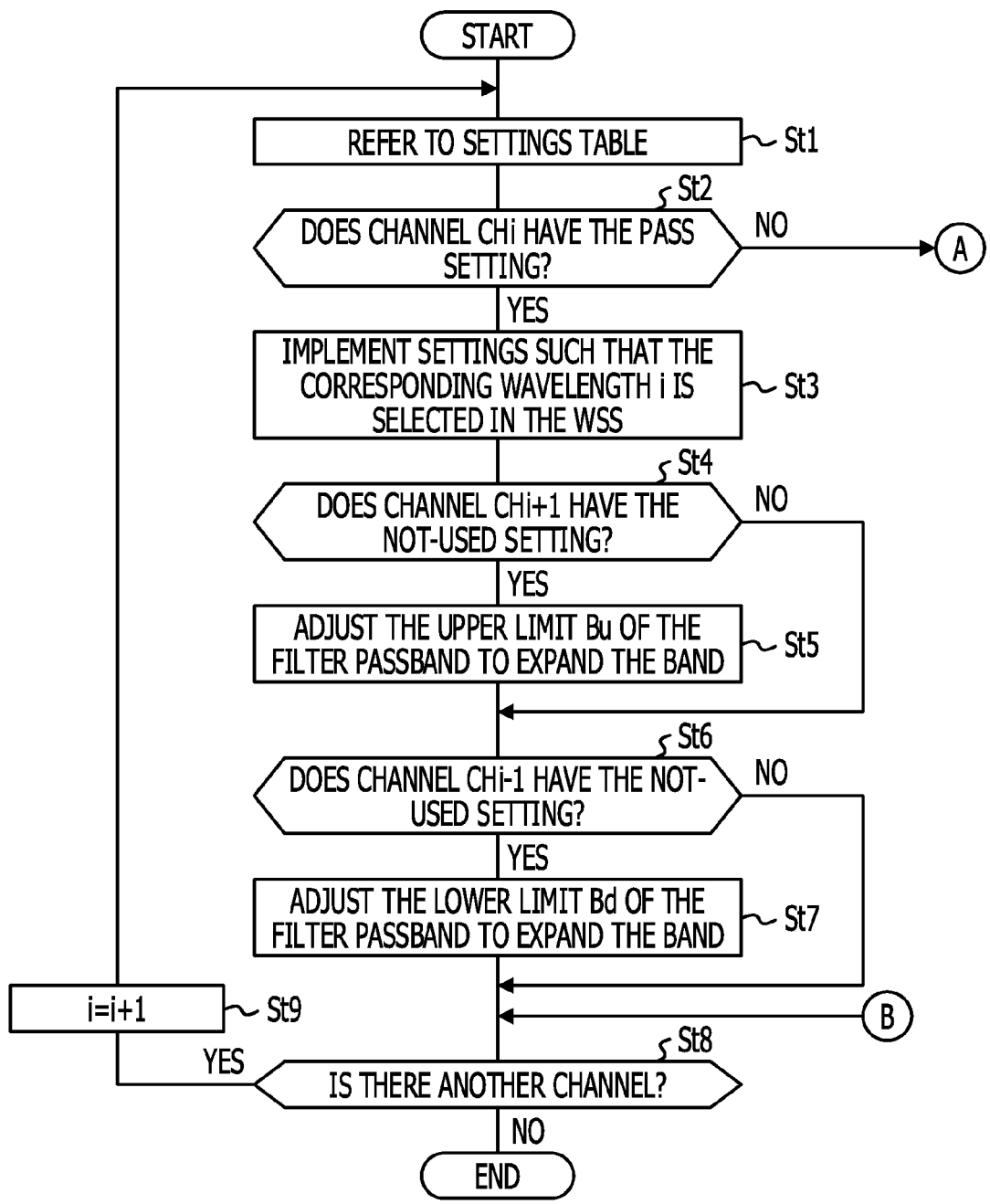
FIG. 12 is a flowchart (1) depicting the processing of a control unit in relation to the control of a filter passband.
Figure 13:
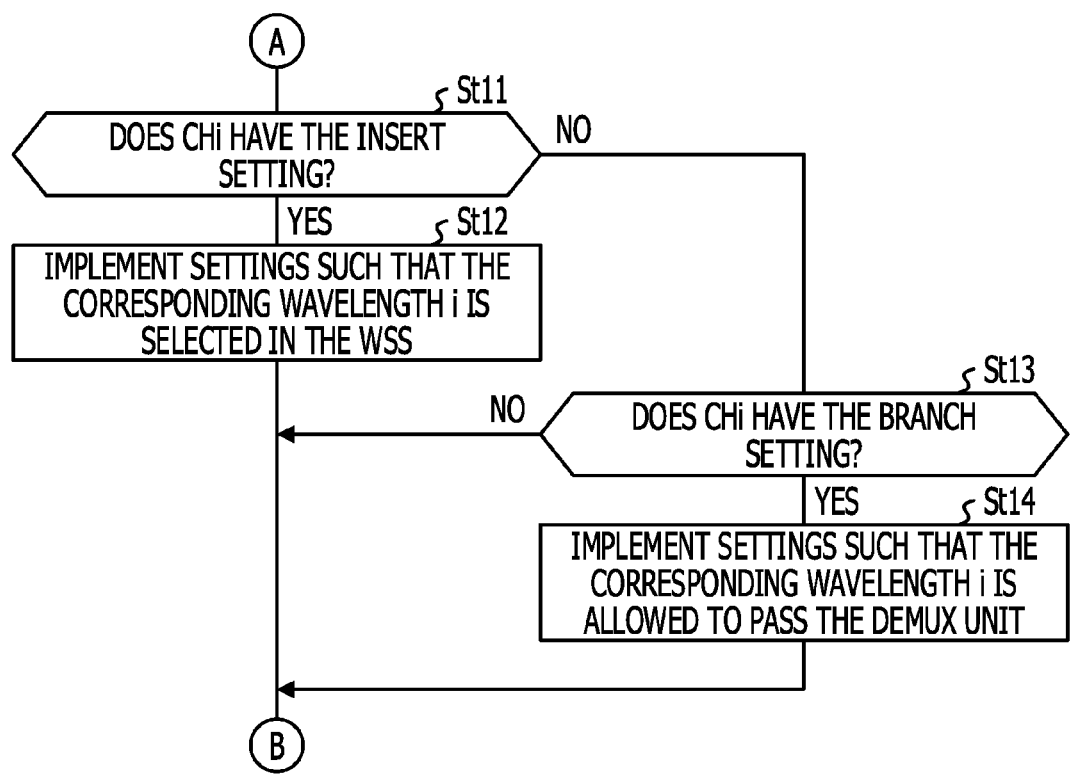
FIG. 13 is a flowchart (2) depicting the processing of a control unit in relation to the setting of a channel.

Next, the processing of the control unit 10 with respect to the settings for a wavelength allocated to a channel is described with reference to the flowcharts of FIG. 12 and FIG. 13. This processing is, for example, performed during activation such as during the powering on of a ROADM device 1, or during the registration and updating of the settings table 111 by the network management device 8. FIG. 12 and FIG. 13 are linked to each other at the portions labeled "A" and "B" and depict a series of processes.

The control unit 10 refers to the settings table 111 stored in the storage unit 11 (S1), and determines whether or not a wavelength λi allocated to channel CHi has the pass setting (S2). If the wavelength λi allocated to channel CHi has the pass setting (YES in S2), the control unit 10 implements settings in such a way that the wavelength λi allocated to channel CHi is selected in the wavelength selective switch 22 (S3). The initial value of the number i is "1", for example.

Next, the control unit 10 determines whether or not one channel CHi+1 adjacent to channel CHi on the frequency axis has the not-used setting (S4). If the wavelength λi+1 allocated to the adjacent channel CHi+1 has the not-used setting (YES in S4), the control unit 10 performs control with respect to the wavelength selective switch 22 in such a way that the upper limit Bu (see FIG. 8) of the filter passband that allows passage of the optical signal of the wavelength allocated to channel CHi having the pass setting is adjusted, and the filter passband is thereby expanded (S5). In S4, if the setting with respect to the wavelength λi+1 that is allocated to the adjacent channel CHi+1 is not registered in the settings table 111, S6 may be performed.

Next, the control unit 10 determines whether or not another channel CHi−1 adjacent to channel CHi on the frequency axis has the not-used setting (S6). If the wavelength λi−1 that is allocated to the adjacent channel CHi−1 has the not-used setting (YES in S6), the control unit 10 performs control with respect to the wavelength selective switch 22 in such a way that the lower limit Bd (see FIG. 8) of the filter passband that allows passage of the optical signal of the wavelength λi allocated to channel CHi having the pass setting is adjusted, and the filter passband is thereby expanded (S7). The control unit 10 then performs the processing of S9. In S6, if the setting with respect to the wavelength λi−1 allocated to the adjacent channel CHi−1 is not registered in the settings table 111, S8 may be performed.

However, if, in the determination processing of S2, the wavelength λi allocated to channel CHi is determined as not having the pass setting (NO in S2), the controller 10 determines whether or not the wavelength λi allocated to channel CHi has the insert setting (S11). If the wavelength λi allocated to channel CHi has the insert setting (YES in S11), the control unit 10 implements settings in such a way that the wavelength λi allocated to channel CHi is selected in the wavelength selective switch 22 (S12). The control unit 10 then performs the processing of S8.

However, if the wavelength λi allocated to channel CHi is determined as not having the insert setting (NO in S11), the controller 10 determines whether or not the wavelength λi allocated to channel CHi has the branch setting (S13). If the wavelength λi allocated to channel CHi has the branch setting (YES in S13), the control unit 10 implements settings in such a way that the wavelength λi allocated to channel CHi is allowed to pass through a tunable filter of a DEMUX unit 13 (S14). The control unit 10 then performs the processing of S8.

The processing of S8 is similarly performed also if the wavelength λi allocated to channel CHi does not have the branch setting (NO in S13).

In S8, the control unit 10 confirms whether or not another channel is registered in the settings table 111 (S8). If another channel is registered (YES in S8), the control unit 10 increments the number i by one (S9), and once again performs processing from S1 for the other channel in the settings table 111.

However, if there are no other registered channels (NO in S8), the control unit 10 finishes processing. In this way, the control unit 10 implements settings with respect to wavelengths allocated to channels.

Figure 14:
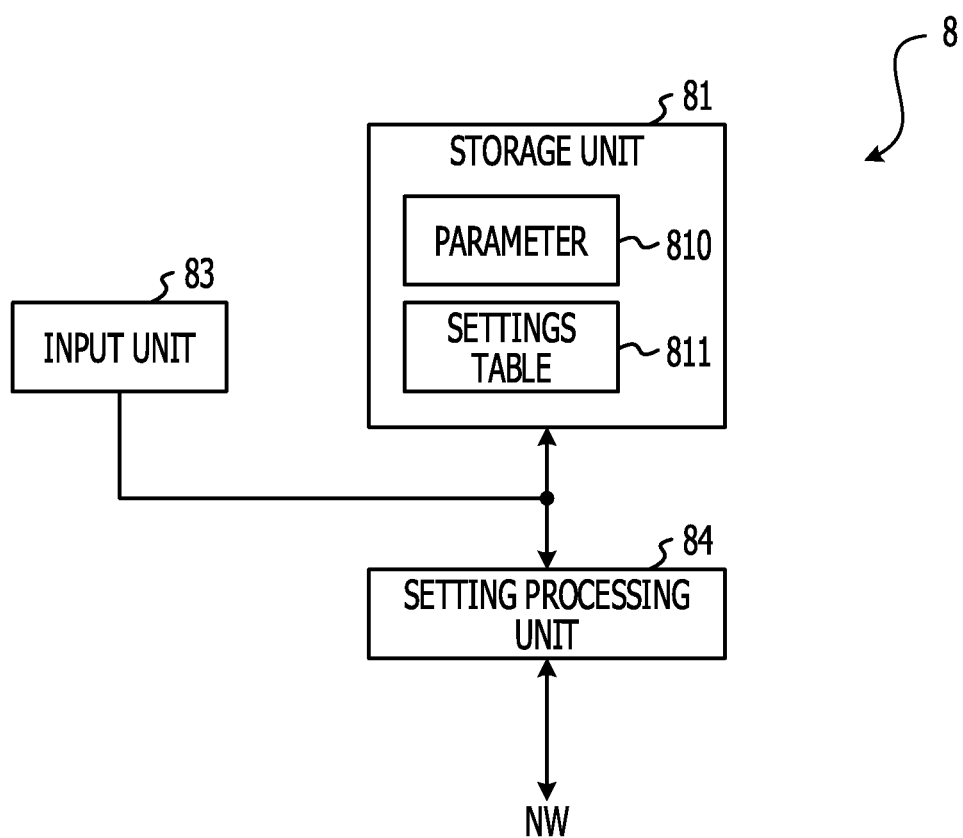
FIG. 14 is a drawing depicting an example of a network management device.

In the aforementioned embodiment, settings are implemented by the control unit 10 based on the settings table 111 set by the network management device 8, but the settings may also be implemented from the network management device 8. FIG. 14 is a drawing depicting an example of a network management device 8.

The network management device 8 is, for example, a server device that may communicate with the ROADM devices 1 by way of the monitoring and control network NW. The network management device 8 has an input unit 83, a setting processing unit 84, and a storage unit 81.

The input unit 83 is a device that is operated by a user in order to input information, and is constituted by a keyboard and a mouse, for example. The setting processing unit 84 is, for example, a processor. To be specific, the setting processing unit 84 is a computational processing circuit such as a CPU, and controls the network management device 8 based on a predetermined program. By way of the monitoring and control network NW, the setting processing unit 84 communicates with the ROADM devices 1, and implements settings with respect to the ROADM devices 1. The setting processing unit 84 is not restricted to functioning by means of software in this way, and may also function by means of hardware such as an integrated circuit intended for a specific use.

The storage unit 81 is, for example, memory. The storage unit 81 stores a parameter 810 relating to the transmission performance of the ROADM devices 1, and stores a settings table 811 in which settings for each wavelength (corresponding channel) of an optical signal is registered. The parameter 810 and the settings table 811 are the same as the aforementioned parameter 110 and settings table 111, and registration for the parameter 810 and the settings table 811 is performed with respect to each of the plurality of ROADM devices 1 by way of the input unit 83. Registration for the parameter 810 and the settings table 811 may be performed by a method of input such as a command line interface (CLI), for example.

The setting processing unit 84 refers to the settings table 811, and implements settings with respect to the aforementioned ROADM devices 1. The setting processing unit 84, for example, transmits an instruction signal including setting details to the control unit 10 of a ROADM device 1. The control unit 10 then implements settings for a wavelength selective switch 22 and a DEMUX unit 13 in accordance with the setting details.

The setting processing unit 84 performs the same processing as the aforementioned control unit 10. Namely, if a channel allocated to the wavelength of an optical signal having the insert setting, and a channel allocated to the optical signal of a wavelength having the pass setting are not adjacent, the setting processing unit 84 expands the band that allows passage of the optical signal of the wavelength having the pass setting. Furthermore, if a channel allocated to the wavelength of an optical signal having the branch setting, and a channel allocated to the optical signal of a wavelength having the pass setting are not adjacent, the setting processing unit 84 expands the band that allows passage of the optical signal of the wavelength having the pass setting.

During this process, the setting processing unit 84 may expand the band that allows passage of the optical signal of the wavelength having the pass setting, by adjusting at least one of the upper limit Bu and the lower limit Bd of the band (see FIG. 8). The setting processing unit 84 may expand the band that allows passage of the optical signal of the wavelength having the pass setting, in accordance with the parameter 810 relating to the transmission performance of the ROADM device 1.

Consequently, an operation and effect that are the same as in the prior embodiment are obtained also in the present embodiment. In the present embodiment, because the setting processing unit 84 manages the ROADM devices 1 within the network 80, the setting processing unit 84 is able to collectively manage the parameters 810 and the settings tables 811 for each ROADM device 1, and implement settings for the ROADM devices 1 collectively.

Although the control unit 10 is provided separate from the wavelength selective switch 22 in the configuration depicted in FIG. 3, the control unit 10 may be included in the wavelength selective switch 22. In this case, as in the prior embodiment, if a channel allocated to a wavelength having the insert setting, and a channel allocated to a wavelength having the pass setting are not adjacent, the control unit 10 expands the band that allows passage of the optical signal of the wavelength having the pass setting. During this process, the control unit 10 may expand the band that allows passage of the optical signal of the wavelength having the pass setting, by adjusting at least one of the upper limit Bu and the lower limit Bd of the band (see FIG. 8). Consequently, the aforementioned operation and effect are obtained also in the present embodiment. In the present embodiment, the storage unit 11 may be provided separate from the wavelength selective switch 22, and may be included in the wavelength selective switch 22.

Figure 15:
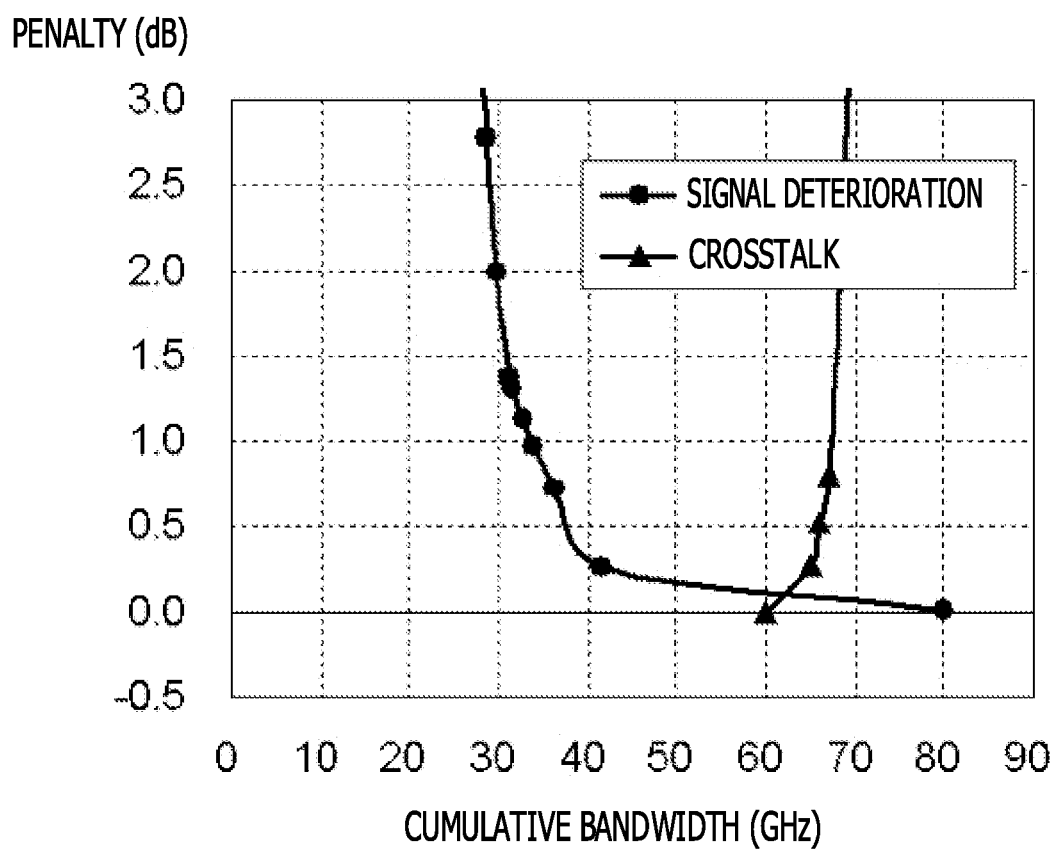
FIG. 15 is a graph depicting the penalty characteristics of signal deterioration with respect to bandwidth, and crosstalk among signals.

Next, the effect of the aforementioned embodiments will be described with reference to FIG. 15 to FIG. 17. FIG. 15 is a graph depicting the penalty characteristics of signal deterioration (see the round marks) caused by spectrum narrowing, and crosstalk among signals (see the triangular marks). The simulation results in FIG. 15 were obtained based on a 40-Gbps optical signal being modulated by means of the return-to-zero differential quadrature phase-shift-keying (RZ-DQPSK) scheme.

The bandwidth of the horizontal axis is a cumulative value of filter passbands in the case an optical signal has passed through a plurality of ROADM devices 1. The signal deterioration penalty caused by the narrowing of the spectrum of the optical signal decreases as this cumulative bandwidth increases. However, if there is a channel that is adjacent on the frequency axis to the channel allocated to the wavelength of the optical signal, and the optical signal of the wavelength allocated to the adjacent channel is blocked (namely, corresponding to the aforementioned blocking during the branching of the optical signal), the crosstalk penalty increases as the cumulative bandwidth increases. Therefore, as previously mentioned, the effects of crosstalk are avoided by not expanding the filter passband if a wavelength having the branch setting is present.

Figure 16:
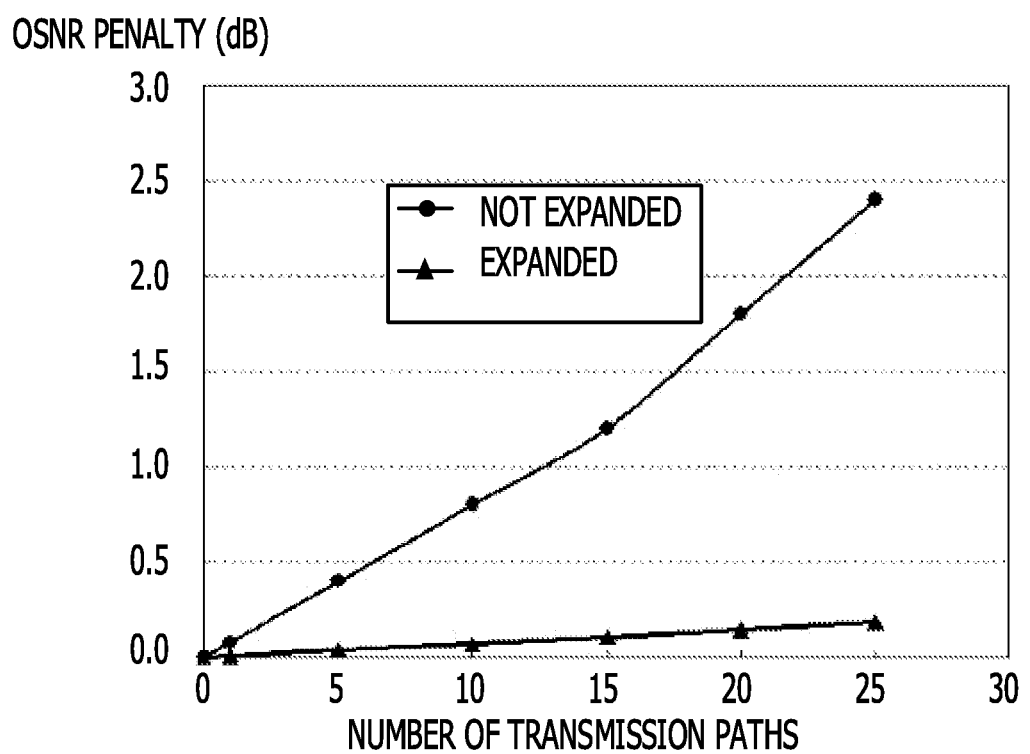
FIG. 16 is a graph depicting optical signal-to-noise ratio (OSNR) penalty characteristics with respect to the number of transmission paths.

FIG. 16 is a graph depicting OSNR penalty characteristics with respect to the number of transmission paths. The triangular marks represent characteristics in the case the filter passband is expanded (expansion by one pixel). The round marks represents characteristics in the case the filter passband is not expanded. The number of transmission paths on the horizontal axis represents the transmission paths (the number of spans) joining the ROADM devices 1. The OSNR penalty on the vertical axis is a value represented by the reference symbol ΔP in FIG. 17.

Figure 17:
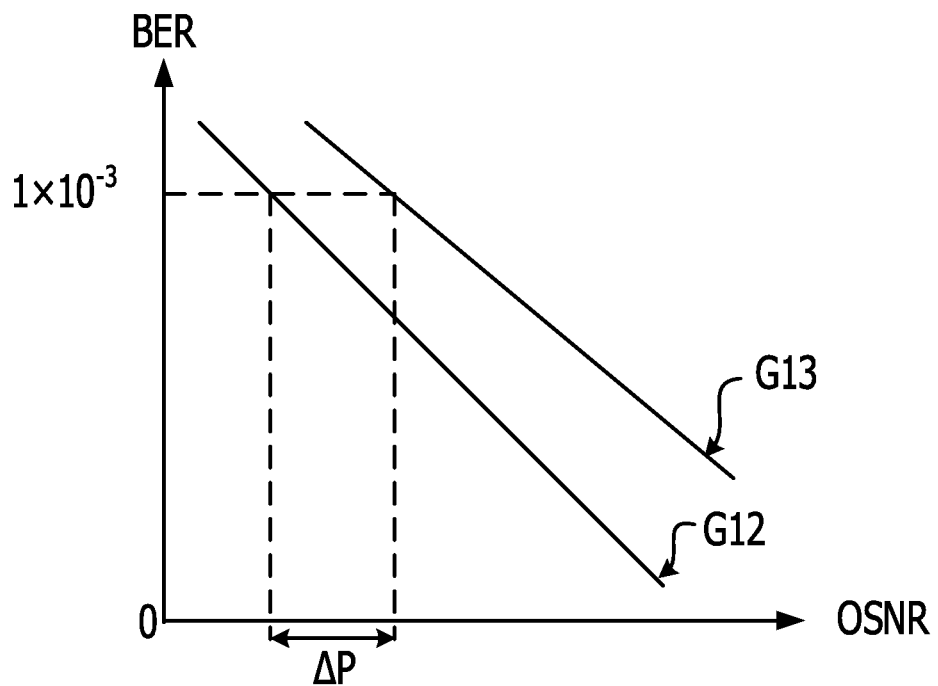
FIG. 17 is a graph depicting the OSNR dependency of a bit error rate (BER).

FIG. 17 is a graph depicting the OSNR dependency of a bit error rate. The OSNR of the horizontal axis represents a ratio of the optical signal power and noise light power. The BER of the vertical axis represents a ratio of the error bit number with respect to the total bit number.

Graph G12 represents OSNR resistance in the case an optical signal is transmitted within one ROADM device 1. Graph G13, on the other hand, represents OSNR resistance in the case an optical signal is transmitted among a plurality of ROADM devices 1. The OSNR resistance represented by graph G13 constitutes the characteristics when an optical signal has passed through a plurality of wavelength selective switches 22. Therefore, the bit error rate is high when compared with graph G12.

The OSNR penalty ΔP of FIG. 17 is the difference between the OSNRs when based on a bit error rate of $1 \times 10^{-3}$. As indicated in FIG. 16, in the case filter passband is expanded, the OSNR penalty indicates more favorable characteristics as the number of transmission paths increases. As previously mentioned, this is because a filter passband of the wavelength selective switch 22 is expanded when a channel allocated to a wavelength having the pass setting from among the insert setting, branch setting, pass setting, and not-used setting is adjacent on the frequency axis to a channel having the not-used setting.

The particulars of the invention have been described above in detail with reference to preferred embodiments; however, it is obvious that a person skilled in the art could adopt a variety of modified forms based on the basic technical ideas and teachings of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical branching and insertion device, comprising:
a wavelength selective switch including a plurality of ports that causes an optical signal of a wavelength among optical signals received at an input port among the plurality of ports to pass to an output port among the plurality of ports;
a memory configured to store setting information including a usage of a channel corresponding to each of a plurality of wavelengths; and
a processor coupled to the memory and configured to cause the wavelength selective switch to execute a process to expand a band through which an optical signal of a predetermined wavelength is allowed to pass, when the setting information indicates that a channel corresponding to the predetermined wavelength is to be used to guide an optical signal from the input port to the output port and a channel corresponding to a wavelength adjacent to the predetermined wavelength is not to be used.

2. The optical branching and insertion device of claim 1, wherein the processor executes the process to expand the band through which the optical signal of the predetermined wavelength is allowed to pass, by adjusting at least one of a numerical upper limit and a numerical lower limit of frequency values of the band.

3. The optical branching and insertion device of claim 1, wherein the processor executes the process to expand the band through which the optical signal of the predetermined wavelength is allowed to pass, in accordance with a parameter relating to the transmission performance of the optical branching and insertion device.

4. The optical branching and insertion device of claim 3, wherein the parameter is transmission speed.

5. The optical branching and insertion device of claim 3, wherein the parameter is transmission distance.

6. The optical branching and insertion device of claim 3, wherein the parameter is a number of spans.

7. The optical branching and insertion device of claim 1, wherein contents of the setting information are registered and updated by the processor based on settings from a network management device coupled to the optical branching and insertion device.

8. A network management device, comprising:
a first memory;
a first processor coupled to the first memory and configured to manage an optical branching and insertion device, the optical branching and insertion device comprising:
a wavelength selective switch including a plurality of ports that causes an optical signal of a wavelength among optical signals received at an input port among the plurality of ports to pass to an output port among the plurality of ports;
a second memory configured to store setting information including a usage of a channel corresponding to; and
a second processor coupled to the second memory and configured to cause the wavelength selective switch to execute a process to expand a band through which an optical signal of a predetermined wavelength is allowed to pass, the setting information indicates that a channel corresponding to the predetermined wavelength is to be used to guide an optical signal from the input port to the output port and a channel corresponding to a wavelength adjacent to the predetermined wavelength is not to be used.

9. The network management device of claim 8, wherein the second processor executes the process to expand the band through which the optical signal of the predetermined wavelength is allowed to pass, by adjusting at least one of a numerical upper limit and a numerical lower limit of frequency values of the band.

10. The network management device of claim 8, wherein the second processor executes the process to expand the band through which the optical signal of the predetermined wavelength is allowed to pass, in accordance with a parameter relating to the transmission performance of the optical branching and insertion device.

11. A wavelength selective switch coupled to a memory configured to store setting information including a usage of a channel corresponding each of a plurality of wavelengths, the wavelength selective switch comprising:
an input port;
an output port; and
a processor that executes a process to expand a band through which an optical signal of a predetermined wavelength is allowed to pass, when the setting information indicates that a channel corresponding to the predetermined wavelength is to be used to guide an optical signal from the input port to the output port and a channel corresponding to a wavelength adjacent to the predetermined wavelength is not to be used.

12. The wavelength selective switch of claim 11, wherein the processor executes the process to expand the band through which the optical signal of the predetermined wavelength is allowed to pass, by adjusting at least one of a numerical upper limit and a numerical lower limit of frequency values of the band.

* * * * *

UNITED STATES PATENT AND TRADEMARK OFFICE
CERTIFICATE OF CORRECTION

PATENT NO. : 9,071,379 B2
APPLICATION NO. : 13/909245
DATED : June 30, 2015
INVENTOR(S) : Hiroki Oi et al.

It is certified that error appears in the above-identified patent and that said Letters Patent is hereby corrected as shown below:

IN THE CLAIMS

Claim 8, Column 17, Line 33 (Approximately)

Delete "corresponding to;" and insert --corresponding to each of a plurality of wavelengths;--, therefor.

Claim 8, Column 17, Line 38 (Approximately)

Delete "the setting" and insert --when the setting--, therefor.

Claim 11, Column 18, Line 20 (Approximately)

Delete "corresponding" and insert --corresponding to--, therefor.

Signed and Sealed this
Thirteenth Day of October, 2015

Michelle K. Lee
*Director of the United States Patent and Trademark Office*